United States Patent [19]

Paolo et al.

[11] Patent Number: 5,756,894
[45] Date of Patent: May 26, 1998

[54] REVOLVING SPEED GAUGING DEVICE WITH A DETACHABLE SENSOR

[75] Inventors: Forestiero Paolo, Airasca To, Italy; Rigaux Christian, Acheres, France

[73] Assignee: SKF Industrie S.p.A., Turin, Italy

[21] Appl. No.: 648,904

[22] Filed: May 16, 1996

[30] Foreign Application Priority Data

May 19, 1995 [IT] Italy .................. T0950119 U

[51] Int. Cl.$^6$ .................. G01D 21/00; G01P 1/02
[52] U.S. Cl. .................. 73/489; 73/866.5; 73/494; 324/173; 324/174; 384/448
[58] Field of Search .................. 73/866.5, 489, 73/493, 494, 514.39, 118.1, DIG. 3; 324/173, 174, 207.2, 207.21, 207.17, 207.25; 384/448, 449; 188/181 A; 310/168; 439/19, 16, 23

[56] References Cited

U.S. PATENT DOCUMENTS

| 4,069,435 | 1/1978 | Wannerskog et al. | 310/168 |
| 4,259,637 | 3/1981 | Bloomfield et al. | 324/166 |
| 5,006,797 | 4/1991 | Smith | 324/173 |
| 5,325,734 | 7/1994 | Jordan | 73/866.5 |
| 5,541,869 | 9/1995 | Alff | 324/173 |
| 5,550,467 | 8/1996 | Goossens | 324/173 |

FOREIGN PATENT DOCUMENTS

| A-2243 331 | 3/1974 | Germany . |
| WO 93/13424 | 7/1993 | WIPO . |

Primary Examiner—Hezron E. Williams
Assistant Examiner—Richard A. Moller
Attorney, Agent, or Firm—Merchant, Gould, Smith, Edell, Welter & Schmidt, P.A.

[57] ABSTRACT

In a device for gauging the relative revolving speed of the races (10, 11) of a ball bearing, an impulse ring (12) is integral with the rotating race (10) of the bearing and faces a sensor (13). The sensor is integral with the stationary race (11) and electrically connected to a unit for processing data generated by the sensor. The sensor (13) is integrated in the body of a detachable connector (17) for fitting in a connection seat (15) fixed to the stationary race (11). The connector is provided with quick coupling means (19, 20) for mounting to said connection seat (15).

8 Claims, 1 Drawing Sheet

REVOLVING SPEED GAUGING DEVICE WITH A DETACHABLE SENSOR

BACKGROUND OF THE INVENTION

The present invention generally relates to devices for gauging rotational speed between two relatively rotating members. More particularly, the invention refers to a revolving speed gauging device with a detachable sensor.

A typical application of the present invention is detection of relative rotational speed between the members supporting the wheel of a vehicle. It is known to install special control circuits on vehicles, such as those known as:

ABS, that have the aim of preventing the vehicle wheels from blocking and sliding during braking;

ASR, that are meant to control the correct driving action of the vehicle wheels;

speed gauging devices, such as speedometers;

distance gauging devices, such as mileometers.

The gauging systems that are actually used are composed of common basic components such as: an impulse ring, a gauging sensor, a local processing unit and an oleodynamic shunt connection unit.

The impulse ring is usually a toothed ring that is mounted on the rotating part to be controlled. The sensor, which can be active or passive, is installed on the chassis facing the toothed part of the impulse ring at a prearranged distance.

The electric signals from the sensor are sent to the local processing unit that gauges, in the case of ABS systems, differences between the revolving speeds of the wheels.

The passive kind of sensors that are actually used measure the reluctance variations and need no power supply. Current passive sensors consists of a coil, a magnet and an anchoring means within the coil. The coil generates an output signal which is dependent on the magnetic filled variation caused by rotation of the impulse ring.

Active kinds of sensors are constituted by components which are responsive to magnetic field variation, such as Hall effect sensors or magneto-resistors. Unlike passive sensors, the active ones require power supply.

At present, there is a general tendency to integrate speed gauging systems with in the bearings. However, the sensor must necessarily be mounted on the outside of the bearing. Therefore, it is in a position where it is not protected from crashes, polluting agents (water, dust, mud) and other possible causes of damage.

To avoid said risks, the sensor is incorporated in a protective and supporting shell secured to the non-rotating race of the bearing so as to contain the sensor in a sealed chamber, protected by the above discussed potential causes of damage.

In practice, an inconvenience of conventional sensors is that these sensors are fastened by a screw to a fixed member supporting the bearing. Therefore, a bore has to be provided in such a supporting member. For applications on vehicles, the member supporting the bearing is the wheel standard, whereby mounting of the sensor implies a constructional complication. In addition, the sensor is exposed to crashes and is adversely affected by vibration due to the fact that the impulse ring is mounted to the bearing while the sensor is fitted to the standard.

SUMMARY OF THE INVENTION

It is an object of the present invention to provide a device capable of obviating the above discussed prior art limits and inconveniences. In particular, it is an object of this invention to provide a device such that assembly and eventually replacement of the sensor are made simple and quick.

It is another object of the present invention to provide a device which allows to substitute only the sensor, should this component fail, and leave the other still operating parts associated with the sensor unchanged.

A further object of the present invention is to provide a device capable of effectively protecting the rotational speed gauging sensor, allowing for reliable connection between the sensor and the on-board processing unit. As said, the sensor ought to be well protected against external polluting elements, crashes and noxious heat sources.

These and further objects which will be more apparent hereinafter are attained according to the present invention by the provision of a device for gauging the relative revolving speed of the races of a ball bearing, of the type comprising an impulse ring integral with the rotating race of the bearing and facing a sensor, the sensor being integral with the stationary race and electrically connected to a unit for processing data generated by the sensor; characterized in that the sensor is integrated in the body of a detachable connector for fitting in a connection seat fixed to the stationary race, said connector being provided with quick coupling means for mounting to said seat.

BRIEF DESCRIPTION OF THE DRAWINGS

For a better understanding of the present invention, reference is made to the following detailed description of a preferred but not limiting embodiment of the invention considered in combination with the accompanying drawings in which.

DETAILED DESCRIPTION OF THE ILLUSTRATED EMBODIMENT

Figure 1:
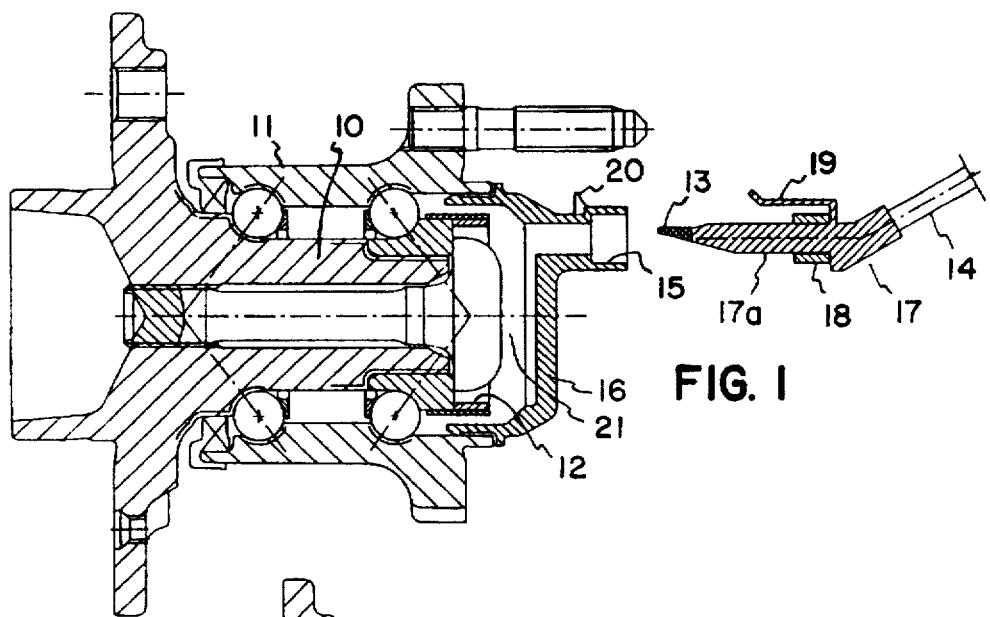
FIG. 1 is an axial longitudinal section view of a wheel hub bearing in which a rotational speed gauging device with a detachable sensor of this invention; the sensor is depicted in a detached arrangement.

Referring initially to FIG. 1, there is shown a rolling contact bearing, for example of the wheel hub of vehicle. The inner race 10 of the bearing forms the rotating part, whilst the outer race 11 is stationary.

Figure 2:
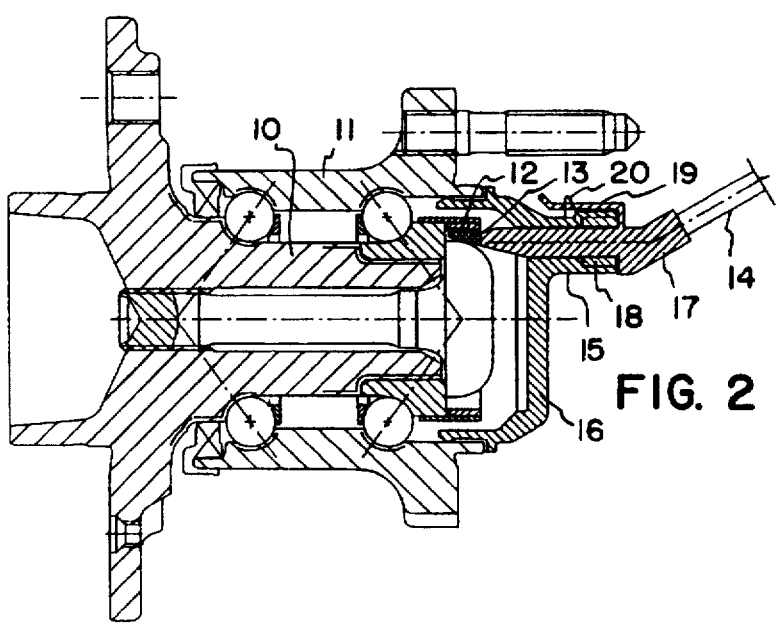
FIG. 2 is a view similar to that of FIG. 1, showing the sensor mounted for normal operation.
Figure 3:
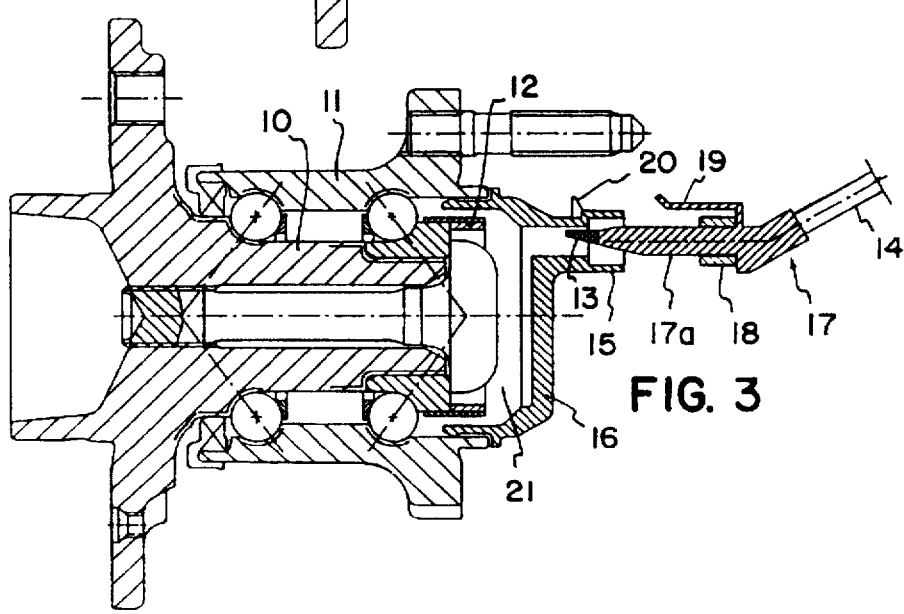
FIG. 3 is a view similar to those of FIGS. 1 and 2, showing the sensor in an intermediate assembling/disassembling step.

The revolving speed gauging device is essentially composed of a rotating impulse ring 12 and a gauging sensor 13, integral with the inner rotating race 10 and the stationary outer race 11 of the bearing, respectively. In normal operation conditions, the sensor 13 faces the impulse ring 12 in the arrangement shown in FIG. 2.

For operation, the sensor is supported by a rigid housing or shell 16 fixed to the non rotating race 11. Housing 16 contains and protects the impulse ring 12 and the sensor 13.

In accordance with the present invention, sensor 13 is detachably mounted to housing 16. The sensor is integrated with the body of a connector 17 electrically connected to a data processing unit (not shown) through a cable 14. Connector 17 is inserted in releasable manner in a connection seat 15 obtained integral with housing 16. Preferably, seat 15 is located in the housing in such a position as to allow to use a connector of substantially straight shape which can be inserted and detached with a simple movement. For example, in the illustrated arrangement the connecting seat is eccentric with respect to the axis of rotation of the bearing. It is located at a radial distance from said axis comparable to the radius of the impulse ring 12. This arrangement permits to position is the sensor 13 at the end of a portion 17a of the connector. Connector portion 17a is substantially straight and parallel to the axis of rotation of the bearing. In the illustrated example, the connection seat 15 is shaped as an appendix extending axially of the side facing the inside of the vehicle. This solution is well adapted for application on non-driving wheels. For driving wheels, the connection seat 15 will be oriented radially or obliquely with respect to the axis of rotation for constructional reasons. However, the arrangement of the connection seat must allow to easily fit the connector holding the sensor proximate to the impulse ring.

Coupling of the connector and its seat is completed by a gasket 18 sealing the chamber 21 closed by the housing which accommodates the sensor.

The connector 17 can be rapidly inserted in and released from the connection seat by acting on a coupling member 19 of the connector resiliently engaging a corresponding coupling seat 20 in the form of a retaining tooth integral with housing 16.

It is to be understood that the embodiment described above is merely exemplary and that persons skilled in the art may make many modifications without departing from the spirit and scope of the invention. All such modifications and variations are intended to be included within the scope of the invention as defined by the appended claims. Particularly, the gauging sensor may indifferently be of the active or passive kind, the rest of the gauging unit being compatible with the kind chosen.

We claim:

1. A device for gauging the relative revolving speed of rotating and stationary races of a ball bearing, comprising:

an impulse ring integral with the rotating race of the bearing and facing a sensor, the sensor being integral with the stationary race and connectable to a unit for processing data generated by the sensor, the sensor being integrated in a body of a detachable connector for fitting in a connection seat fixed to the stationary race and formed integrally with a rigid housing enclosing the impulse ring, the connector being provided with an unthreaded, quick coupling means for mounting to said seat, wherein a watertight coupling is formed by a gasket between the connector and the connection seat.

2. A device as claimed in claim 1, wherein the connector comprises a body of substantially straight shape having an end portion to which the sensor is fixed.

3. A device as claimed in claim 1, wherein the sensor is integral with an elastic coupling member adapted for engaging a corresponding rigid hooking means of the connection seat.

4. A device according to claim 1, wherein the connection seat is shaped as an axially extending appendix.

5. A device according to claim 1, wherein the connection seat is shaped as an appendix radially extending with respect to a central axis of the bearing.

6. A device according to claim 1, wherein the connection seat is shaped as an appendix extending and forming an acute angle with a central axis of the bearing.

7. A device according to claim 1, wherein the connection seat is located in a position eccentric with respect to an axis of rotation of the bearing by a distance proximate to the radius of the impulse ring.

8. A device for gauging the relative revolving speed of rotating and stationary races of a ball bearing, comprising:

an impulse ring integral with the rotating race of the bearing and facing a sensor mounted relative to the stationary race and electrically connected to a unit for processing data generated by the sensor, the sensor being integrated in a body of a detachable connector for fitting in a connection seat fixed to the stationary race and formed integrally with a rigid housing enclosing the impulse ring, the connector being integral with an elastic coupling member adapted for engaging a corresponding rigid hooking means of the connection seat, and the connector forming a watertight coupling with the connection seat using a gasket.

* * * * *